Nov. 17, 1931.                    W. H. GINDER                    1,832,831
                                TOASTING APPARATUS
                              Filed June 4, 1929            2 Sheets-Sheet 1
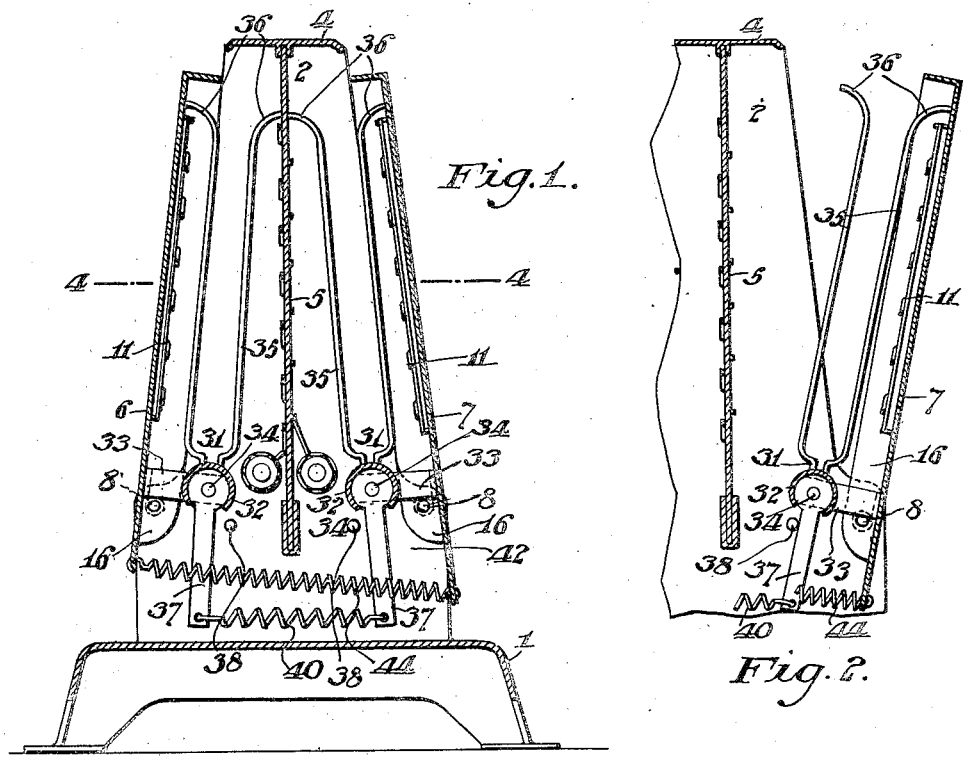
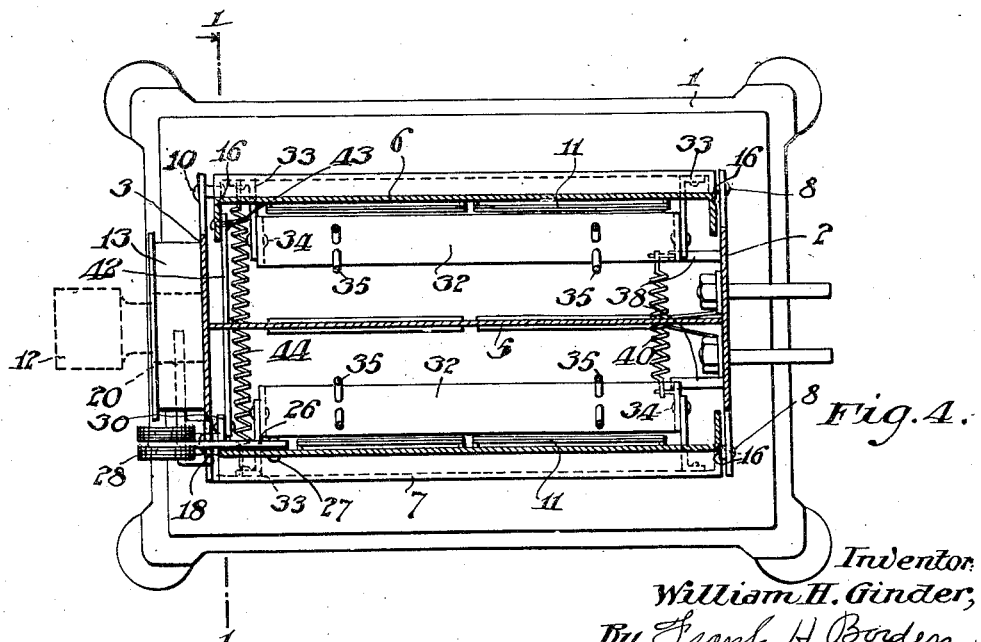
Inventor
William H. Ginder,
By Frank H. Borden
Attorney.

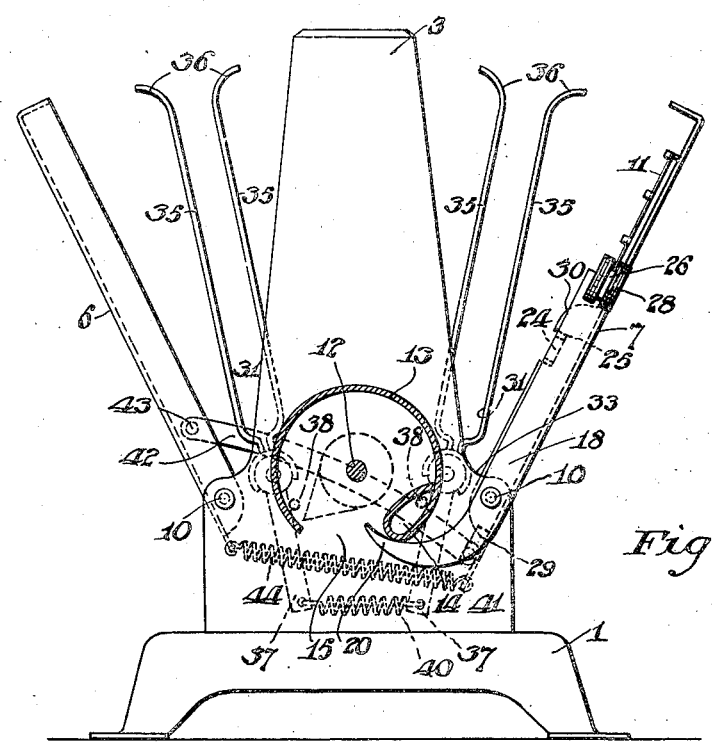
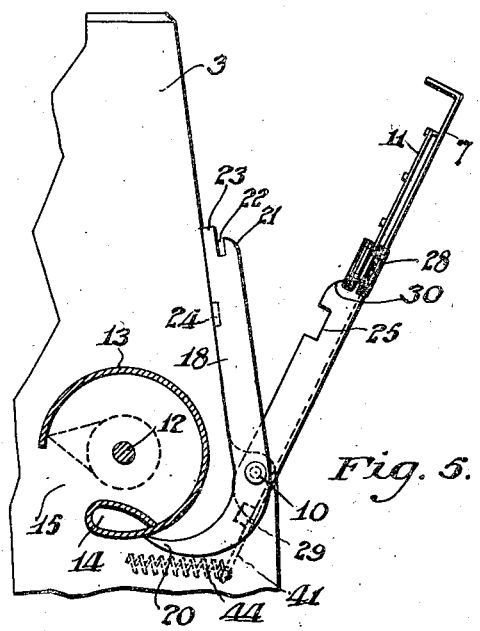
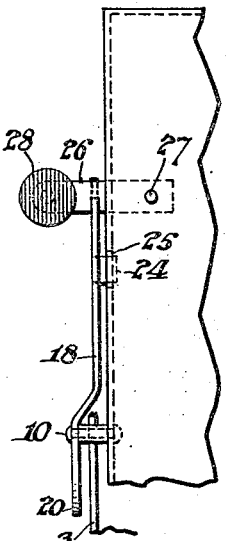

Patented Nov. 17, 1931

1,832,831

UNITED STATES PATENT OFFICE

WILLIAM H. GINDER, OF HADDONFIELD, NEW JERSEY, ASSIGNOR TO ELECTRO MANUFACTURING COMPANY OF AMERICA, OF PHILADELPHIA, PENNSYLVANIA, A COMPANY OF PENNSYLVANIA

TOASTING APPARATUS

Application filed June 4, 1929. Serial No. 368,384.

This invention relates to toasting apparatus and more particularly to automatic electric toasters.

In an earlier invention exemplified by application for Letters Patent #277,903, filed May 15, 1928, I disclosed a new and improved toaster having certain important features of novelty. In that invention means were provided for supporting slices of material in spaced relation to the heated elements of the toaster whereby slices of material could be inserted in or removed from the toaster without danger of burns from contact with the heated elements. The means disclosed, however, required rather exact initial positioning of the sliced material in order to secure the desired result. This feature of the earlier invention has been improved upon so that sliced material can be inserted in or removed from the toaster without regard for any particular initial positioning but with the same beneficial result. Moreover the improvement just noted has resulted in a simplification of the construction with a consequent appreciable reduction in manufacturing costs. In the earlier invention it was provided that the toasting operation be controlled by horological means, but that the opening of the toaster might also be accomplished manually. This depended upon a predetermined condition of the timing mechanism before the manual means was operative. This feature of the invention has now been improved upon so that manual means may be used regardless of the condition of the timing mechanism.

Among the objects of the invention, therefore, are: to improve the construction of electric toasters whereby a cheaper construction cost is attained; to provide a toasting apparatus in which slices of material can be inserted or removed without danger of burns from contact with heated elements and without requiring exact initial location of the slice of material; to provide a toasting apparatus which is automatically actuatable, but which is also manually actuatable without regard to the condition of the automatic means; to provide an electric toaster with electric heating elements from which the conventional guard strips are omitted with safety; to provide a toasting apparatus with an improved bread carrier; to provide a bread carrier for electric toasters which acts as a guard for the electric heating elements of the toaster; to provide in connection with a toaster having a pivoted side member, a bread carrier movable with the side member into toasting relation and out of toasting relation therewith, but susceptible to positioning in spaced relation to the side member; to improve the construction of toasters whereby ledges and the like that might catch crumbs and hold same are eliminated; to provide in an automatic toaster means whereby the bread can be instantly moved out of toasting relation manually regardless of the condition of the timing mechanism when desired; and many other objects and advantages as will become more apparent as the description proceeds.

In carrying out the invention in the preferred though purely illustrative form, there is provided a central heater, with a pair of pivoted side heaters movable simultaneously into and out of toasting relation with the central heater, a bread carrier comprised of a frame with resilient free ended fingers is pivotally mounted on each side member, mechanically actuated means are provided for permitting the members to move outwardly on their pivots in response to the urge of a spring, an arm moved by the mechanical means is pivoted relative the central heater, and a latch mounted on a side member can be manually actuated to engage or release from said arm according to whether the toaster is to be mechanically or manually operated. It is preferred also that the spring fingers of the bread carrier take the place of the conventional guard for the heating surfaces by having portions extending from their plane into abutting relation to the heating surfaces.

In the accompanying drawings forming part of this specification:

Fig. 1 represents a transverse vertical section through the improved toaster of this invention with the parts in their closely grouped association for the actual toasting operation.

Fig. 2 represents a fragmentary transverse section of one side of the toaster of this invention with the parts in partially spaced relation as the movable heating element is part way out from the central heating element subsequent to the toasting operation.

Fig. 3 represents an end elevation of the toaster according to this invention with the parts moved to their separated limit and with the toast or bread carrier disclosed in its spaced relation to each heating element for the safe insertion or removal of bread or toast without danger of burning the fingers.

Fig. 4 represents a horizontal section taken on line 4—4, of Fig. 1, to indicate the disposition and construction of the toast or bread carrier.

Fig. 5 represents a fragmentary end elevation of the device similar to Fig. 3, but in which the cam is so arranged as to prevent the automatic opening of the toaster, but with the movable member in spaced relation to the central heating element as it is when the device is manually actuated.

Fig. 6 represents a fragmentary detail of the latch mechanism in its relation to the pivoted arm actuated by the cam.

The invention in its preferred form, as illustratively disclosed in the drawings, but which is obviously susceptible to many changes and modifications, includes a base 1, end members 2 and 3 and a top plate 4, as a rigid and immovable frame work. Preferably an intermediate or central double faced heating element 5 is provided substantially perpendicular to the base, although vertically spaced thereabove. In the interests of economy the customary guard or spacing members usually provided to prevent contact of the toast with the heating member may be omitted in view of the construction of the bread carrier as will be further described. Mounted on horizontal axes, between the end plates are the side members respectively 6 and 7, as by means of pins 8 and 10 respectively passing through the respective end plates, and flanges 16 on each side member.

Each side member preferably comprises a heating surface, by the provision of a heating element 11 in spaced relation to the side wall of the member. It will be understood to be preferred that the side members move inwardly simultaneously toward the central heating member or element, for the simultaneous toasting of both sides of slices of material disposed between the respective heating surfaces. It is preferred that this be accomplished by some such means as is disclosed in the application aforesaid of which the essential part, for the present purposes at least, comprises a rotatable shaft 12, mounted on the end plate 3, and carrying a cam element 13, having an inwardly extending curved track or guide 14, at the mouth of a cam opening 15, and which cam element is arranged to be mechanically or otherwise rotated. In the application noted, the cam and shaft were arranged to rotate in one direction by manual means, and in the other direction by a clock spring. In any case it may be characterized as automatically actuated. In the aforesaid application one side member carried a rigid curved arm, the end of which rode the outer surface of the cam until the cam opening registered with the end of the arm, permitting the arm to move inwardly of the cam, and thus permitting the side member to swing outwardly on its horizontal axis by spring pressure applied to the member. This is somewhat modified by the invention herein.

Each pivoted side member 6 and 7 as noted has an inturned flange 16 with which the pivot pins engage. Side member 7 is attached to the inside of end plate 3, by a pin 10, which extends beyond the face of the end plate or member 3. On the extended portion of the pin on the outside of the end plate 3, preferably, an arm 18 is pivotally mounted. The lower portion of the arm has a curved end 20, arranged to ride upon the cam surface of the cam, and to enter the cam opening when the cam is properly disposed on its axis to receive it. The arm 18 is preferably bent inwardly of the end plate 3 just above the pivot pin 10, so that its rear edge abuts the edge of the end plate 3 as a stop. The upper portion of the arm 18 is located in a plane substantially parallel with the plane of end plate 3 but inwardly thereof and has a sloping edge 21 leading to a vertical slot 22, the end of the arm extending beyond the level of the sloping portion on the other side of the slot, to form a stop 23. The upper portion of the arm carries at the edge toward the end plate 3, a flange or hook 24, arranged to engage a recess 25 in the flange 16 of the side member 7. By the arrangement so far described the arm 18 normally abuts the end plate 3, in which position it is held while the curved end 20 thereof engages the cam surface of cam 13, in which position it offers a keeper for engagement by the latch, to be described, so that the side member can be locked in closed position. If the arm 18 is moved upon its pivot 10, it may engage the side member and force it outwardly if a spring is not provided to urge it out, but it has no direct engagement whereby it can force it inwardly as the cam is actuated. Such direct engagement is contemplated, however, as by the mechanism now to be described.

A latch arm or latch 26, is pivoted to the face of the side member 7, behind the heating element, as at 27, and carries the insulated knob or handle 28, by means of which it may be actuated, and which is of sufficient weight to cause it to drop downwardly by gravity. The flange 16 is cut away in horizontal alignment with the latch, but the upper portion thereof, as at 30, acts as a stop to limit its downward movement. This stop 30 is located just below the edge of the sloping portion of the upper end of the arm 18, in the extended position of the side member 7. The arrangement is such that relative movement of the side member and arm toward each other causes the latch arm to ride up on the sloping portion, abut the higher portion or stop on the other side of the slot, then to drop into the slot to positively lock the arm and side member together. Release of the side member from the arm is quite simple and easy, requiring but a slight upward movement of the latch to effect the desired result. In this manner, the manual operation of the toaster, and the insertion and removal of the bread or toast becomes a simple and easy matter when desired, as if, by chance, there should be any interruption of the operation of the automatic mechanism, the toaster would not thereby be placed out of commission.

In order to simplify the construction and form the support for the toast out of contact with the heating elements, a bread carrier is provided of unique construction. This bread carrier 31 comprises a lower curved support or base 32 disposed horizontally and pivoted to the lower portion of the inside of the movable heating element, as by means of bracket arms 33 and pins 34. The upper surface of the curved support is convex so that crumbs and the like falling down upon it find no resting place, but slide off onto the top of the base member 1, from which they are readily removed. Arising from the upper convex surface, are a plurality, preferably four, of spring arms 35, arranged in oppositely disposed pairs, such as to engage a slice of material between each pair, each arm being rather resilient, and terminating at the upper free portion in oppositely extending flanges or angle elements 36. Each pair of spring fingers and the base forms a slotted compartment having an open mouth into which bread or the like may be inserted and which is limited in its downward movement by the base, moreover each spring finger is arranged respectively to abut portions of the adjacent heating elements, or their supports, out of electrical contact therewith, if the toaster be an electric one, and such as to maintain a spaced relation of the slice of material to the heating surface. This is quite effective for the purpose and obviates the necessity for the provision of the usual guards and the like that have heretofore been considered a necessity for toasting devices. Obviously, such guards may be applied if desired for any reason.

In order to cause the movement of the bread carrier into such position that it is properly spaced relative the heating elements, a depending arm 37, is rigidly attached to one end of the longitudinal member, so that movement of the arm swings the carrier on its horizontal axis. An inwardly extending bracket is mounted rigidly upon the inner surface of the end plate 2, as at 38, in such position as to permit the abutment of the depending arm 37 when the side member is swung on its axis. In the preferred form of the invention as there will be one central heater and two pivoted or movable heaters, there will be two toasting spaces for simultaneously toasting both sides of two or more slices of material. In this case, there will be a similar bread or toast carrier on the other side of the central heating element as shown. In order to urge the two bread carriers apart, or rather away from the central heating element, a resilient device such as a spring 40 may be connected between the two depending arms 37 of the respective bread carriers.

In operation it will be understood that with the side members moved to their widest outwardly spaced relation to the central heating element, the bread carriers will be disposed with their open mouths, evenly and appreciably spaced from both the central and movable heaters. Slices of bread or the like may then be dropped safely into the carriers, without fear of burning the fingers. The side members are then caused to be moved toward the central heating surface, in a manner to be described, during which movement the movable heating member approaches the relatively stationary bread carrier, until the tip ends, or flanges, of the outer resilient fingers are abutted by the side member, continued inward movement of the side member causes the bread carrrier to swing upon its pivot on the side member, until the inner resilient fingers contact, through their flanges, with the central heating surface. With both heaters in contact with the adjacent spring fingers of the bread carrier, the fingers may be flexed slightly upon the compressible bread, with a resilient grip, holding it against movement during the toasting operation which now ensues. Subsequent to the toasting operation, and pursuant to the outward movement of each side member, each carrier swings on its pivot (owing to the action of the resilient member 40), traveling outwardly with the side member until the depending arm of the bread carrier abuts and is stopped by the inwardly projecting bracket on the end plate 2, when its outward movement with the side member terminates and the side members respectively continue on to the outermost limits of their movement. Any suitable means may be used to determine the extent of opening movement of each side member, such as stops 29.

In order to cause the initial outward movement of the side members, and the synchronism of their movements, it is preferred that the flange 16 of the side member 7 be continued in an extension or arm 41, below the pivot point of the member. A cross link 42 extends from this last mentioned arm 41, to the pivot point 43 on the flange 16 of the other side member 6, above its pivotal connection to the end plate 3. The crosslink slides under the central heating element, and is so disposed that the side members swing on their pivots in synchronism.

In order to secure the outward movement of the side members, they are placed under resilient tension, as by means of a cross spring, or the like 44, connecting the two side members below their respective pivotal points or axes.

It will be understood that in the normal operation of the device, the latch is located in the slot 22, so that the arm 18 and side member 7 are locked together. In this position, rotation of the shaft 12 and cam element 13 causes the cam to change its position relative the curved end of the arm 20 although, owing to the tension on the side members from the spring 44, the curved end is maintained in contact with the cam. As the arm end rides into the cam opening during the rotation of the cam, the side members simultaneously begin to move outwardly away from the central section or heating element under the influence of the spring 44. In order to return the side member to close toasting association with the central heating element, rotation of the shaft and thus of the cam, forces the end of the arm out of the cam opening, swinging the arm about its pivot, and thus forcing the side heating elements in to toasting relation to the central heater.

If the cam opening is disposed so that the arm end may move into and out of the opening, then the latch arrangement may or may not be utilized, as the arm may be swung on its pivot by manual movement of the handle or knob 28. If, however, the cam opening is out of registry, so that the arm is locked by the contact its end has with the solid portion of the cam, then the latch may be lifted to release the side member from engagement with the arm 18, and the manual operation of the device may be resorted to, as will be clear. As noted, in this latter situation the arm 18 is held in retracted abutting relation to the end plate 3, and is locked therein by the engagement of its curved end on the surface of the cam, and thus forms a cooperating element, or keeper for engagement with and disengagement from the latch on the side member.

Many modifications may be resorted to as will be apparent to those skilled in the art, such as the change of location or number of parts, as well as the use of other forms of heaters than electrical, but these changes and such others as may arise are to be construed as within the scope of the invention as recited in the following claims.

I claim as my invention:

1. In a toasting apparatus, a pair of relatively movable heating elements, mechanical means for effecting relative movements of the elements, the mechanical means including an arm removably engaging one of said elements, means for positively connecting the arm to the element, and said means operable to disconnect the arm from said element for manually effecting relative movements of the said elements.

2. In a toasting apparatus, a stationary element, a movable element pivotally mounted relative the first element, an arm pivoted relative the stationary element and having a portion in position to abut the movable element, means for pivotally actuating the arm to move the element, means for removably engaging the arm and movable element so that they move together as the movable element is moved.

3. In a toasting apparatus, a frame member, a side member pivoted to the frame on a horizontal axis, an arm pivoted to the frame member and having a portion in position to abut the pivoted side member, mechanical means including a cam arranged to swing the arm and thus to swing the side member, a latch mounted on the side member and arranged to engage the arm to connect the arm and side member, said latch operable to disconnect the arm and side member so that the side member may be manually swung regardless of the position of the cam relative the arm.

4. In a toasting apparatus, a pair of relatively movable heating elements, a bread carrier including outwardly flared portions mounted independently of the heating elements, means for effecting relative movements of the heating elements whereby they assume a toasting relation to the bread carrier, the flared portions arranged to abut the respective heating elements to maintain spaced relation of the bread to the respective heating elements.

5. In a toasting apparatus, a movable and a stationary heating element, a pivoted bread carrier mounted on one element and arranged to be engaged between the heating elements upon their relative movement in toasting relation thereto, and operable to support material in wider spaced relation to each heating element upon relative separating movement of the elements.

6. In a toasting apparatus, a bread carrier comprised of a convex base, wire fingers mounted on the base and arranged in spaced pairs, the fingers having free ends, the ends being respectively oppositely flared to form a mouth for the reception of bread, the bread carrier arranged for abutting relation to a pair of elements such that the flared ends of the finger contact with the respective elements and maintain a predetermined spaced relation of the elements from the material.

7. In a toasting apparatus, a frame, a stationary heating element mounted on the frame, a side heating element pivoted to the frame, means for moving the side member on its pivot, a bread carrier pivoted on the side member, resilient means urging the bread carrier toward the side member, and means limiting the outward movement of the bread carrier on its pivot as the side member moves outwardly on its pivot to locate the bread carrier in spaced relation to the side member and to the stationary heating element.

8. In a toasting apparatus a pair of relatively movable heating elements, means urging the elements apart, mechanical means for urging the elements together, and means operable to disconnect the mechanical means from the elements whereby the elements may be manually actuated.

9. In a toasting apparatus, a central element and a pivoted side element, means urging the side element outward from the central element on its pivot, latch means operable to hold the side member in close relation to the central element against the urge of said first mentioned means.

10. In a toasting apparatus, a frame including an end plate, a movable member pivoted to the end plate on one side thereof, an arm pivoted to the end plate on the other side from the member and having a portion extending transversely of the end plate, means on said portion for engagement with the movable member, said arm having an end arranged for operative association with the rotatable element, a rotatable element associated with the end plate of the frame for actuating the arm, means urging the movable member outwardly on its pivot, and means arranged for removably connecting the portion of the arm with the movable member whereby rotation of the rotatable element may force said movable member inwardly against the urge of the said urging means.

11. In an electric toaster, an electric heating element, and guard means therefor, the guard means comprised of a bread carrier having resilient fingers including stop portions and arranged to abut the element with the stop portions in engagement with the element, but with the contents of the bread carrier in spaced relation to the element.

12. In a toasting apparatus, a pair of relatively movable members one of which is a heating element, a device for moving one member, means for actuating the device, latch means mounted on the device and said one member normally in engagement to cause the device to move said member in response to the actuation of the actuating means, and said latch means operable for disengagement to permit movement of said member independent of the actuating means and of the device actuated thereby.

13. In a toasting apparatus, a pair of members arranged for relative swinging on a horizontal axis, a support disposed between the members on a horizontal axis, means for relatively moving the members to form a predetermined angle therebetween, and means for swinging the support to a position spaced between the members but forming a smaller angle with the respective member than said predetermined angle.

Signed at Philadelphia, county of Philadelphia, State of Pennsylvania, this first day of June, 1929.

WILLIAM H. GINDER.